(12) United States Patent
Golec

(10) Patent No.: US 11,993,717 B2
(45) Date of Patent: May 28, 2024

(54) COMPOSITION, METHOD AND USE

(71) Applicant: Marcin Golec, London (GB)

(72) Inventor: Marcin Golec, London (GB)

(*) Notice: Subject to any disclaimer, the term of this patent is extended or adjusted under 35 U.S.C. 154(b) by 68 days.

(21) Appl. No.: 16/664,915

(22) Filed: Oct. 27, 2019

(65) Prior Publication Data
US 2020/0231813 A1 Jul. 23, 2020

(30) Foreign Application Priority Data

Jan. 21, 2019 (EP) ..................................... 19152743
Oct. 14, 2019 (EP) ..................................... 19203046

(51) Int. Cl.
| C08L 91/06 | (2006.01) |
| B62J 13/00 | (2006.01) |
| B62M 9/00 | (2006.01) |
| C08K 3/04 | (2006.01) |
| C08K 5/01 | (2006.01) |
| C08K 5/05 | (2006.01) |
| C08L 23/28 | (2006.01) |
| C08L 33/08 | (2006.01) |
| C08L 91/08 | (2006.01) |

(52) U.S. Cl.
CPC ............... *C08L 91/06* (2013.01); *B62J 13/00* (2013.01); *B62M 9/00* (2013.01); *C08K 3/042* (2017.05); *C08K 5/01* (2013.01); *C08K 5/05* (2013.01); *C08L 23/28* (2013.01); *C08L 33/08* (2013.01); *C08L 91/08* (2013.01); *B62M 2009/005* (2013.01); *C08L 2201/52* (2013.01)

(58) Field of Classification Search
CPC ........... C08L 91/06; C08K 3/042; C08K 5/01; B62M 9/00
USPC ....................................................... 524/488
See application file for complete search history.

(56) References Cited

U.S. PATENT DOCUMENTS 5,885,947 A * 3/1999 Maples .............. C10M 169/048
508/491
2010/0276229 A1 11/2010 Winckler
2011/0046027 A1* 2/2011 Zhamu ................. C10M 103/02
977/734

FOREIGN PATENT DOCUMENTS

| CN | 102618373 A | 8/2012 |
| CN | 107418683 A | 12/2017 |
| EP | 3301139 A1 | 9/2017 |

OTHER PUBLICATIONS

Hunting for Speed, searching for the fastest lubes on the planet, Velonews.com, Feb. 2014, pp. 64-66) (Year: 2014).*
Berman et at (Graphene: a new emerging lubricant, Materials Today, vol. 17, No. 1, Jan./Feb. 2014, pp. 31-41) (Year: 2014).*
Highland OldGit (Youtube Wax treatment on MTB Chain video: https://www.youtube.com/watch?v=-b4gFqhj1Pc, Apr. 2017) (Year: 2017).*
American Petroleum Institute (API), Waxes and Related Materials, Jan. 2011) (Year: 2011).*
How To Wax A Bicycle Chain I Maintenance Monday, Video, Nov. 13, 2017, Global Cycling Network.

* cited by examiner

*Primary Examiner* — Doris L Lee
(74) *Attorney, Agent, or Firm* — Rivka Friedman

(57) ABSTRACT

The present invention is directed to a wax with graphene compositions offering surprising benefits in reducing bicycle or motorbike chain lengthening, particularly in off road environments with high dirt and water levels such as during mountain biking or off-road biking. The invention is further directed to a method of preparing such compositions and to the use of such compositions on bicycle or motorbike chains.

8 Claims, No Drawings

1

COMPOSITION, METHOD AND USE

TECHNICAL FIELD

The present invention is directed to a method of protecting a bicycle or motorbike chain from dirt by dripping a composition on the chain, to a method of cycling using a mountain bike with a bicycle chain by first treating the bicycle chain with a dirt protecting composition and subsequently cycling in an off-road environment, and to a method of preparing a composition and to a composition for use in protecting bicycle chains from dirt.

Further, the invention is directed to a method of riding a bicycle or motorbike with a chain by first treating the chain with a protecting composition and subsequently riding in an off-road environment.

The invention is also directed to a chain covered or treated with a composition according to the invention.

The invention further relates to a composition comprising wax and graphene, a method of preparing the composition comprising wax and graphene and the use of the composition comprising wax and graphene. Hereafter, the composition comprising wax and graphene is referred to as "wax-graphene composition" which preferably comprise low or no water.

BACKGROUND TO THE INVENTION

Bicycle or motorbike chains are treated with lubricants, such as liquid oil-based or aqueous-based lubricants to smoothen metal to metal contact. Such "lubes" are dripped on the bicycle or motorbike chain. Oil-based lubricants with different viscosities are available on the market, some having additives like Teflon powder. These oils however do not dry and collect a lot of dirt during bicycle rides, particularly off road, creating in effect an abrasive paste that resides inside a chain. Dirt collection compromises the durability of the bicycle or motorbike chain over time, leading to chain lengthening. CN102618373 discloses an oil-free bicycle chain lubricant. Commercially available aqueous-based lubricants include wax compositions that dry somewhat over time leaving a wax layer on the chain. However, the layer does not fully dry and remains somewhat sticky, thus also collecting dirt.

Another lubrication option is to apply so-called "dry lube" which consists of a solvent such as ethanol and an additive such as Teflon or a ceramic powder. After evaporation of the solvent, the additive is left in dry form on the chain. Wind and chain movement however quickly remove the additive, rendering this option generally ineffective in lubricating bicycle chains.

Bicycle or motorbike chains can also be immersed in a bath of hot, molten, liquid paraffin wax. Such bathes are at around 150° C. After removal of the chain from the bath, a thin layer of solid wax is left on the chain for lubrication. Depending on the environmental conditions, frequent reapplication of the wax is required, probably every few hundred kilometers under normal conditions but under off road conditions even more frequently. In addition pure paraffin becomes brittle when dry and accelerates wearing out of the lubricant.

There remains a need for keeping bicycle or motorbike chains in optimal condition, particularly when the bicycle or motorbike chains are exposed to dirt in challenging off-road environmental conditions with high dirt levels such as those used in mountain biking.

SUMMARY OF THE INVENTION

The present invention is directed at extending the life of bicycle and motorbike chains. While lubricants of the prior art smoothen (i.e. lubricate) metal to metal contact, we realized they still lead to undesirable, fast bicycle or motorbike chain lengthening over time particularly in off road conditions due to abrading metal of chain pin and inner plate extrusions. Such bicycle or motorbike chain lengthening is undesirable as it compromises the interaction between the bicycle or motorbike chain and the sprockets, leading to increased friction between chain and chainrings and sprockets that lowers power transfer from the pedals to the wheels. Fast increasing pitch of the chain, due to wear, exponentially increases wear on all the components that have a contact with a chain, namely chainrings, cassettes and derailleur pulleys.

Accordingly, it is the objective of the present invention to extend the life of bicycle or motorbike chains by limiting bicycle or motorbike chain lengthening in off-road environments with high dirt levels, such as those used in mountain biking.

The present invention is directed a method of protecting a bicycle or motorbike chain from dirt by dripping a composition comprising from 35 to 90% by weight of water; from 5 to 60% by weight of wax selected from microcrystalline wax, paraffin and mixtures thereof; and from 0.005 to 10% by weight of graphene on the chain. Preferably, the composition comprises from 50 to 80% by weight of water and preferably from 10 to 50% by weight of wax. By definition the amount of the above three components is 100% by weight or less of the composition, as other optional ingredients can be added to the composition as discussed below.

Further, the invention is directed to a method of cycling or riding using a mountain or motorbike with a bicycle or motorbike chain by first treating the bicycle or motorbike chain with a dirt protecting composition comprising from 35 to 90% by weight of water; from 5 to 60% by weight of wax selected from microcrystalline wax, paraffin and mixtures thereof; and from 0.005 to 10% by weight of graphene and subsequently cycling or riding in an off-road environment. Preferably, the composition comprises from 50 to 80% by weight of water and preferably from 10 to 50% by weight of wax. By definition the amount of the above three components is 100% by weight or less of the composition, as other optional ingredients can be added to the composition as discussed below.

Further, the invention is directed to a method of preparing a composition comprising from 35 to 90% by weight of water; from 5 to 60% by weight of wax selected from microcrystalline wax, paraffin and mixtures thereof; and from 0.005 to 10% by weight of graphene, by preparing an aqueous composition with water and wax and subsequently stiffing in the graphene. Preferably, the composition comprises from 50 to 80% by weight of water and preferably from 10 to 50% by weight of wax. By definition the amount of the above three components is 100% by weight or less of the composition, as other optional ingredients can be added to the composition as discussed below.

Furthermore, the invention is directed to a composition for use in protecting bicycle or motorbike chains from dirt comprising from 35 to 90% by weight of water; from 5 to 60% by weight of wax selected from microcrystalline wax, paraffin and mixtures thereof; and from 0.005 to 10% by weight of graphene. Preferably, the composition comprises from 50 to 80% by weight of water and preferably from 10 to 50% by weight of wax. By definition the amount of the above three components is 100% by weight or less of the composition, as other optional ingredients can be added to the composition as discussed below.

Preferably, the composition further comprises from 0.1 to 10% by weight of an inhibitor or a plurality of inhibitors (i.e. one or more inhibitors).

The invention is directed to a bicycle or motorbike chain covered by a composition comprising from 35 to 90% by weight of water; from 5 to 60% by weight of wax selected from microcrystalline wax, paraffin and mixtures thereof; and from 0.005 to 10% by weight of graphene. Preferably, the composition comprises from 50 to 80% by weight of water and preferably from 10 to 50% by weight of wax. By definition the amount of the above three components is 100% by weight or less of the composition, as other optional ingredients can be added to the composition.

The invention is further directed to a composition comprising wax and graphene, herein called "wax-graphene composition", preferably with low or no water. Furthermore, the invention is directed to as a method of preparing the wax-graphene composition and a method of using the wax-graphene composition.

Specifically, the invention is further directed to a wax-graphene composition for use in protecting bicycle or motorbike chains from dirt comprising more than 65% by weight of wax and from 0.005 to 10% by weight of graphene.

Further, the invention is directed to a method of protecting a bicycle or motorbike chain from dirt by immerging the chain in a molten wax-graphene composition comprising more than 65% by weight of wax and from 0.005 to 10% by weight of graphene.

Further, the invention is directed to a method of riding using a mountain bike or motorbike with a chain by first immerging the chain in a wax-graphene composition comprising more than 65% by weight of wax and from 0.005 to 10% by weight of graphene and subsequently riding in an off-road environment.

Further, the invention is directed to a method of preparing a wax-graphene composition comprising more than 65% by weight of wax and from 0.005 to 10% by weight of graphene, by melting the wax and subsequently stiffing in the graphene.

Further, the invention is directed to a bicycle or motorbike chain covered by a wax-graphene composition comprising more than 65% by weight of wax and from 0.005 to 10% by weight of graphene.

Preferably, the wax is selected from microcrystalline wax, paraffin and mixtures thereof, more preferably paraffin. Preferably, the wax is present at a level of up to 99.99% by weight of the wax-graphene composition. Preferably, the wax-graphene composition further comprises from 0.1 to 7% by weight of oily substances that are liquid at room temperature and up to 99.89% by weight of wax. Preferably, the wax-graphene composition comprises less than 30% by weight of water.

Surprisingly, we have found that the compositions including wax-graphene compositions of the present invention provide protection against dirt and reduce bicycle and motorbike chain lengthening in bicycle or motorbike applications. While the prior art teaches lubrication to smoothen metal-metal contact, the present invention is directed at protecting the bicycle or motorbike chain against the effects of dirt that deposits in and on the bicycle or motorbike chain, negatively affecting the chain durability and leading to undesirable chain lengthening. Surprisingly, we have found that use of the dirt protecting composition of the invention leads to better and longer bicycle and motorbike chain life under such circumstances. Furthermore, the present invention synergistically combines the effect of lubrication by means of the wax present on the chain and the dirt protection effect by means of the graphene entrapped in the wax. Additionally, applying the wax-graphene composition of the invention in molten state to the chain results in less chain lengthening and assists in keeping the chain cleaner requiring less frequent rewaxing of the chain, particularly when the comparison is made under muddy riding conditions. The chain is preferably immersed in the molten graphene-wax composition.

Without wishing to be bound by any theory, it is believed that water used as a medium in aqueous compositions allows the graphene to penetrate into the chain while the wax subsequently keeps the graphene on the chain. Similarly, immersing the chain in the molten wax-graphene composition allows the graphene to penetrate the chain while the wax keeps the graphene in place after solidification.

Chain lengthening can easily be determined using a standard device a so-called "chain checker tool". Of course, a regular rule or caliper may also be used. Chain lengthening can be expressed in percentages where 0% represents a new chain while 100% chain lengthening represents such lengthening that the standard chain checker tool sinks into the chain links on both sides; this means that the chain has lengthened to such an extent that replacement should be considered; in cycling, this is generally considered to be the standard of 0.5 mm over 10 links.

DETAILED DESCRIPTION OF THE INVENTION

Compositions of the invention including wax-graphene compositions preferably comprise graphene material. Graphene consists of 1 nm thick sheets of hexagonally organized carbon structures. The physical structure and physical properties are different from graphite with which it should not be confused. Graphene is very strong, water repellant, electric-conductive, air tight material and was only discovered in 2004 in the UK. "Graphene: a new emerging lubricant" by Diana Berman et al., Materials today, vol 17, number 1, January/February 2014 discusses the lubricating qualities of graphene in solid state and in oil-based compositions. U.S. Pat. No. 8,222,190 discloses the general use of graphene for lubrication and exemplifies oily based compositions.

For the purpose of the invention, graphene oxide is considered to be covered by graphene. Graphene can be produced from graphite by various methods known in the art.

We found that application of graphene in dry powder form to the chain does not lead to good chain protection results due to the fact that powder is quickly removed by air flow and moving chain. Also, application of graphene in oily compositions leads to accumulation of dirt on and in the bicycle or motorbike chain, due to the oily composition attracting and collecting dirt. However, we have surprisingly found that compositions comprising graphene in combination with wax, applied in an aqueous composition or in a molten wax-graphene composition (that preferably comprise low or even no water) to the bicycle chain, leads to surprisingly limited chain lengthening even under challenging environmental conditions with high dirt levels such as mountain biking.

According to the invention, graphene is preferably added to the composition including the wax-graphene composition in particulate form, for instance measured with STEM (Scanning Transmission Electron Microscopy) with a lateral size in the range of 400 nm+/−150 nm and a flake thickness of 3 nm+/−2 nm but smaller or larger particles may also be used.

Preferably, the graphene has 9 +/−6 layers. In one embodiment, the invention is directed to crumpled graphene. Beneficially, we have found that crumpled graphene does not agglomerate and does not stick together. While graphene (including graphene oxide) can be used in the invention, crumpled graphene (or crumpled graphene oxide) can be sufficiently mixed into aqueous wax compositions or wax-graphene compositions according to the invention without the use of a dispersant or surfactant.

Preferably, the composition including the wax-graphene composition of the invention comprises graphene at level of from at least 0.005% by weight, more preferably from at least 0.01% by weight and preferably up to at most 10% by weight, more preferably up to at most 5% by weight, most preferably at most 3% by weight, especially preferred at most 1% by weight and in particularly preferred at most 0.5% by weight.

According to the invention, graphene is preferably combined with wax in an aqueous carrier composition. Wax may be present in the composition in particulate form or dissolved, but the composition is preferably an aqueous wax emulsion or solution. Such aqueous wax emulsions and solutions are well-known in the art and have been available for a long time. After application on bicycle or motorbike chains, the water evaporates from the compositions, leaving a thin layer of wax and graphene on bicycle or motorbike chains, which acts surprisingly well against the detrimental effects of dirt on bicycle or motorbike chains.

Compositions including wax-graphene compositions of the invention comprise wax. The wax of the invention is preferably solid at room temperature. The wax is preferably selected from hard waxes with a melting point of preferably higher than 45° C., more preferably higher than 55° C., most preferably higher than 60° C. and preferably up to 110° C., more preferably up to 100° C. Melting points can be measured using needle penetration, for instance as measured according to the American standard ASTM D5, of 3 to 40 at 25° C.

Preferably, wax is selected from animal waxes, vegetable waxes, mineral waxes, synthetic waxes, and mixtures thereof. Animal waxes are preferably beeswax, spermaceti, lanolin, and shellac wax. Preferred vegetable waxes are carnauba, candellila, bayberry, and sugarcane wax. Preferred mineral waxes are ozokerite, ceresin, montan, paraffin, microcrystalline wax, petroleum and petrolatum wax. Preferred synthetic waxes are silicone waxes, polyol etheresters, hydrogenated plant oils such as castor oil, jojoba wax, sunflower oil, cotton oil, copra oil and lanolin oils; ethylenic polymers, and hydrocarbon type wax, such as Fischer Tropsch waxes. According to the invention, paraffin can be high grade paraffin which only has up to 1% of oil (by weight of paraffin) or it can be lower grade paraffin containing more oil for instance up to 20% or 10% by weight of paraffin.

Preferred waxes of the invention are petroleum derived wax, including petrolatum (petroleum jelly), microcrystalline wax and paraffin. More preferred are microcrystalline wax and paraffin. Particularly preferred is paraffin. Paraffin is solid at room temperature and is provided in block or chunks.

Preferably, a composition with 30% or more by weight of water comprises wax at a level of from at least 5% by weight, more preferably at least 10% by weight, most preferably from at least 20% by weight, in particularly preferred from at least 30%, and preferably up to at most 60% by weight, more preferably at most 50% by weight and most preferably up to at most 45% by weight.

Preferably, wax-graphene compositions of the invention—that preferably have low levels of or no water—comprise wax at higher levels, as indicated below.

Preferably, the composition with 30% or more by weight of water—other than the wax-graphene compositions of the invention—comprises a liquid phase. The liquid phase preferably comprises water at a level of at least 80% by weight, more preferably at least 90% by weight or more and preferably up to 100% by weight. Preferably the composition of the invention comprises water at a level of at least 35% by weight, more preferably at least 50% by weight of the composition, most preferably from at least 55% by weight, in particularly preferred from at least 60% by weight, and preferably up to at most 90% by weight, and more preferably from at most 80% by weight. Wax-graphene compositions of the invention are however preferably solid at room temperature and preferably comprise water at low or no levels as indicated below.

According to a preferred embodiment of the present invention, an inhibitor is added to assist in preparing the wax composition including the wax-graphene composition. The term inhibitor is well-known in this industry. Inhibitors are used in commercially available products, such as Squirt® and Smoove®. For the purpose of the invention, an inhibitor—sometimes called "crystallization inhibitor" or "wax inhibitor"—is defined as a compound that affects—inhibits—crystallization of the wax. According to the invention, the inhibitor physically affects crystallization of the wax and assists in preparing an emulsion. Inhibitors exist with a wide variety of chemical structure. Examples are the Basoflux® product series, such as PI and RD types that also find application in compositions of the present invention. Other brand names are Shellsol, Flowsolve 120 (acrylic polymer). Polyacrylates can be used (see examples mentioned in "Evaluation of effects of selected wax inhibitors on wax appearance and disappearance temperatures", Wang et al, Petrol Sci Technol, 2003, 359-368). Solvents and oils, such a mineral oil and organic oil, can be used. Specific examples are hexane or xylene or Solvesso 100® (2E,4E-hexa-2,4-dienal). Further examples are emulsifiers such as polyethylene glycol sorbitan monostearate (for example Tween 40® and Tween 60®), hexadecanol, polyethylene glycol hexadecyl ether (for example Brij 52®), cocoamidopropyl betaine (abbreviated as CAPB) and diethanolalkylamines (for example wherein alkyl is $CH_3-(CH_2)_n$- with n from 13 to 21).

Depending on the type, the composition of the invention including wax-graphene compositions preferably comprises at least an (i.e. one or more) inhibitor as indicated above at a level of from 0.5% by weight of the composition, more preferably from 1% by weight and preferably up to 10% by weight, more preferably up to 7% by weight, and most preferably up to 5% by weight.

We have found that dirt particles accumulate more in the liquid oily compositions. This may render oily substances (liquid at room temperature) less attractive for incorporation at higher levels in certain compositions of the invention. Accordingly, certain compositions of the invention preferably comprise liquid oily substances at levels less than 10% by weight of the composition, more preferably less than 5% by weight, most preferably less than 3% by weight, while in certain embodiments, preferably, these compositions are free of such liquid oils. However, wax-graphene compositions preferably comprise oil compounds, as indicated below.

The composition of the invention -including wax-graphene compositions may optionally comprise further ingredients. For instance, solvents or specifically organic solvents (such as ethanol, propanol, isopropylalcohol) may be at levels up to 10% by weight. Preferably biocide solvents are included in the composition of the invention. Preferred biocide solvents are 5-Chlor-2-methyl-2H-isothiazol-3-on, 2-Methyl-2H-isothiazol-3-on, and/or mixtures thereof, for instance at levels up to 10% by weight. Dispersants or surfactants can be included, though that is not needed for crumpled graphene.

The invention further relates to a method of protecting bicycle or motorbike chains from dirt by dripping the composition comprising 30% by weight or more water on bicycle or motorbike chains. Subsequently, the water is left to evaporate, preferably while moving the bicycle chain over the sprocket and chain ring to distribute the composition of the invention in and on bicycle or motorbike chains. After water evaporation, the resulting composition is pasty (i.e. has a shoe polish with a paste-like consistency) which is beneficial for retaining the wax and graphene in place on bicycle or motorbike chains, yet does not excessively collect dirt.

As well-known in this technical field, bicycle and motorbike chains generally comprise links. Each of those links consists of several parts that are typically combined as follows: each of the two ends of a first outer plate 1 is connected through a first inner plate and a second inner plate to a second outer plate with a pin. The pins are surrounded by roller 5 and, often, a bushing is present between the roller and the pin. Similar chain designs exist without bushings, these are sometimes called "bushing-less". While usable in bushing-less bicycle chains, the present invention is particularly useful in reducing chain lengthening in bicycle or motorbike chains with bushings. Teeth of the chain ring and the sprocket engage with subsequent rollers of the links of the bicycle or motorbike chain, moving the bicycle or motorbike forward.

The invention is further directed to a method of cycling using a mountain bike with a bicycle chain wherein first the bicycle chain is treated with the dirt protecting composition including the wax-graphene compositions according to the invention and, subsequently, the bicycle is used in an off-road environment. Compositions including the wax-graphene compositions of the invention are particularly useful for mountain bikes (sometimes called all terrain bike). These bicycles often have suspension at least for the front wheel and preferably also for the rear wheel. Importantly, the tires of mountain bike have knobs, made of rubber, and extending radially outwards, generally for around 1 to 5 mm. These knobs improve the tire's grip on the underlying soil, offering stability in off-road environments. However, the knobs on the moving tires also increase the amount of dirt kicked up onto the bicycle chain, thus aggravating the problem of chain lengthening. Accordingly, the composition including the wax-graphene compositions of the invention is particularly useful for mountain bikes that are used in off-road environments. The composition including the wax-graphene composition according to the invention can be used on any chain with chain links and is preferably used on bicycle and motorbike chains.

In a further embodiment, the invention is directed to a composition comprising a wax and graphene, which is hereafter called "wax-graphene composition" which preferably comprises low (less than 30% by weight) or no water. The wax-graphene composition is preferably solid at room temperature. The type of wax for the wax-graphene composition is preferably as identified hereabove and herein. The amount of wax in the wax-graphene composition is preferably more than 65% by weight, more preferably at least 80% by weight, most preferably at least 88% by weight and preferably at most 99.99% by weight, and more preferably at most 99.89% by weight, most preferably at most 98% by weight of the composition, in particularly preferred at most 95% by weight, especially preferred at most 92.99% by weight.

The graphene for the wax-graphene composition is preferably as identified herein. The amount of graphene in the wax-graphene composition is preferably at least 0.005% by weight, more preferably from at least 0.01% by weight and preferably up to at most 10% by weight, more preferably up to at most 5% by weight, most preferably at most 3% by weight, especially preferred at most 1% by weight and in particularly preferred at most 0.5% by weight.

The graphene for the wax-graphene composition is preferably as identified herein. The amount of graphene in the wax-graphene composition is preferably at least 0.01% by weight and preferably at most 5% by weight of the composition.

The wax-graphene composition may comprise further preferred and optional ingredients. The wax-graphene composition preferably comprises an inhibitor (as herein defined and at levels herein defined). Most preferably, the inhibitor comprises an oil compound, more preferably a mineral or organic oil; preferably this oil compound is liquid at room temperature. Thus, the wax-graphene composition preferably comprises a liquid oil compound, for example paraffin liquidum. Though not wishing to be bound by any theory, we believe incorporating the oil compound leads to a wax-graphene composition that is less brittle (which means it stays better on the chain after application and cooling down, reducing chain lengthening). Preferably the oil compound is present at a level of from 0.1% by weight, more preferably from 0.2% by weight, most preferably from 0.5% by weight, in particular preferred from 1% by weight of the composition and preferably at most 10% by weight, more preferably at most 7% by weight, most preferably at most 5% by weight of the composition. Preferably, the wax-graphene composition comprises less than 30% by weight of water, more preferably less than 10% by weight, most preferably less than 5% by weight, in particular preferred less than 3% by weight of the composition, while it is especially preferred the wax-graphene composition essentially does not comprise water or is non-aqueous.

The wax-graphene composition preferably comprises optional additives like PTFE powder and/or molybdenum disulfide ($MoS_2$) powder. Each of these additives is present at a level of preferably from 0.01% by weight, more preferably from 0.1% by weight and preferably at most 3% by weight, more preferably at most 1% by weight of the composition.

The invention is further directed to a method of preparing the composition comprising wax and graphene, wherein graphene is mixed into the molten wax. Preferably, the oil and/or any other ingredients are also mixed into the molten wax.

The invention is further directed to the use of the composition comprising wax and graphene by applying a molten wax-graphene composition to a bicycle or motorbike chain. Preferably, the chain is immerged in the molten wax and is subsequently preferably subjected to agitation. Then, the chain covered with the wax-graphene composition is left to cool down. Preferably, the chain covered with the wax-graphene composition is mounted on a bicycle or motorbike.

EXAMPLES

Example 1—Preparation

The composition according to the invention was prepared by stiffing graphene (3% by weight; graphene) into an aqueous wax composition that comprised paraffin (40% by weight; solid paraffin), inhibitor (2% by weight; diethanolalkylamines), biocide solvent (1% by weight; 5-Chlor-2-methyl-2H-isothiazol-3-on) and water (at 100% by weight).

Example 2—Comparative Example

The composition prepared in example 1 was tested on a bicycle chain and compared to the same composition without graphene. In this experiment, a bicycle chain was treated with the composition to be tested and the bicycle with the chain was positioned on a stand and pedals were moved during 6 blocks of each 1000 km Blocks had differently defined standard conditions, including no contamination (blocks 1, 3 and 5), dry contamination (block 2), wet contamination (block 4) and extreme contamination (block 6; 2× more water and 2× more dirt—including soil and sand—than in wet contamination).

After each block, bicycle chain lengthening was measured with the precision caliper. Chain lengthening was expressed in percentages wherein 100% represents the lengthening of the chain such that the standard chain checker tool sinks into the chain links on both sides: this is a standard procedure for determining that chain replacement should be considered.

During block 4, the composition with wax and graphene only had 33.7% chain lengthening while the comparative composition with wax but without graphene performed worse with 41.7% chain lengthening.

The composition of the invention had total chain lengthening of 86% after block 5. The chain treated with the comparative composition (without graphene) had passed 100% chain lengthening during block 5 (in fact 107%).

It is concluded that the aqueous composition comprising a combination of wax and graphene according to the invention outperformed the same composition without the graphene, supporting the surprising and inventive character of the present invention.

Example 3—Comparison With Commercially Available Lubricants

The composition of the invention prepared in Example 1 was tested in the same set-up as Example 2 but was this time compared to commercially available lubricant products. The chain treated with oil-based Rock N Roll Gold passed 100% lengthening during block 4 (122% stretch). The chain treated with aqueous wax-based composition Squirt® also passed the 100% mark in block 4. The chain treated with oil-based White Lightening Epic Ride® failed in block 3. Wax-based Smoove® failed in block 5. Oil-based Muc Off Hydro Dynamic® and Muc Off Nano® both already failed in block 2. Oil-based Cycle Star Gold® failed in block 3. Oil-based Silca NFS® failed in block 5, while wax-based Wend Wax-2® failed in block 3. The composition of the invention was still usable in block 6.

In conclusion, the composition of the invention outperformed all commercially available lubricants that were tested under the same conditions. In fact, the composition of the invention even beat each of those lubricants during each block. This further supporting the inventive character of the present invention compared to commercially available products used for lubricating bicycle chains.

Example 4—Comparison With Molten Wax Chain Treatment

The composition of the invention with wax and graphene prepared in Example 1 was also compared to a bicycle chain that was treated with molten wax that was reapplied 3 times during every block, thus every 333 kilometers Importantly, this requires a cumbersome process for each block requiring: taking the bicycle chain of the bicycle, cleaning the chain, treating the chain with molten paraffin, brushing off excess wax and placing the chain again on the bike (see also above explanation in the description).

The composition of the invention outperformed the molten wax in blocks 2 and most importantly in block 6, the block with high levels of dirt and water, even though the molten wax chain was cleaned and treated every 333 kilometers. Particularly, this block 6 is representative for mountain biking or for instance off-road motorcycling races. Accordingly, the composition of the invention is surprisingly most suitable for protection of bicycle or motorcycle chains against high dirt levels such as conditions typical for mountain biking or off-road motorbiking.

Example 5—Wax-Graphene Composition Versus Composition Comprising Wax

A wax-graphene composition (wax-graphene composition A) according to the invention was prepared by stiffing 1% by weight of graphene into 99% by weight of molten paraffin at a temperature of around 150° C. A bicycle chain was treated with the molten wax-graphene composition and mounted on a bicycle. Wax-graphene composition A showed reduced chain lengthening in comparison to commercially available MSW wax product comprising wax and additives (PTFE and MoS2) as evidenced by and measured with power loss over distance (km).

Example 6—Wax-Graphene Composition With Oil Versus Composition Comprising Wax

Addition of 5% by weight of liquid paraffin oil and 1% by weight of graphene to 94% molten paraffin (wax-graphene composition B) further reduced chain lengthening, in comparison with commercially available MSW wax product. In fact, commercially available MSW composition showed 8.2 W power loss after 333 km (requiring reapplication) while wax-graphene composition B lasted 2100 km Composition B had a pastier appearance and seemed to stay better on the chain.

These results prove that wax-graphene compositions of the invention have surprisingly good characteristics as to reducing chain lengthening.

The invention claimed is:
1. A method of protecting a bicycle or motorbike chain from dirt by submerging the chain in a molten composition comprising more than 88-99.99% by weight of wax, 0.01-3% by weight of graphene, and more than 0% and less than 30% by weight of water;
   wherein the composition, when cooled, is adapted to protect the chain from dirt.

2. The method according to claim 1, wherein the wax is paraffin.

3. The method according to claim 1, wherein the composition further comprises 5% by weight of oily substances that are liquid at room temperature.

4. The method according to claim 1, wherein the composition is adapted to minimize the frequency of reapplication of the molten composition to the chain.

5. The method according to claim 1, wherein the composition is adapted to reduce chain lengthening.

6. A method of riding using a mountain bike or motorbike with a chain by first submerging the chain in a composition comprising more than 88-99.99% by weight of wax, 0.01-3% by weight of graphene, and more than 0% and less than 30% by weight of water; and subsequently riding in an off-road environment.

7. The method according to claim 6, wherein the wax is paraffin.

8. The method according to claim 6, wherein the composition further comprises 5% by weight of oily substances that are liquid at room temperature.

\* \* \* \* \*